(12) United States Patent
Lu et al.

(10) Patent No.: US 10,330,870 B2
(45) Date of Patent: Jun. 25, 2019

(54) OPTICAL FERRULE FOR MULTI-FIBER CABLE AND HARDENED MULTI-FIBER OPTIC CONNECTOR THEREFORE

(71) Applicant: CommScope Technologies LLC, Hickory, NC (US)

(72) Inventors: Yu Lu, Eden Prairie, MN (US); Steven C. Zimmel, Minneapolis, MN (US); Gregory J. Schaible, Lakeville, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/172,282

(22) Filed: Oct. 26, 2018

(65) Prior Publication Data

US 2019/0129104 A1 May 2, 2019

Related U.S. Application Data

(63) Continuation of application No. 15/463,639, filed on Mar. 20, 2017, now Pat. No. 10,114,181, which is a
(Continued)

(51) Int. Cl.
  *G02B 6/40* (2006.01)
  *G02B 6/38* (2006.01)
  *G02B 6/36* (2006.01)

(52) U.S. Cl.
  CPC .......... *G02B 6/406* (2013.01); *G02B 6/3664* (2013.01); *G02B 6/3879* (2013.01); *G02B 6/3885* (2013.01)

(58) Field of Classification Search
  CPC .......... G02B 6/25; G02B 6/406; G02B 6/381; G02B 6/3823; G02B 6/3833;
  (Continued)

(56) References Cited

U.S. PATENT DOCUMENTS 5,048,917 A  9/1991 Komatsu
5,689,598 A  11/1997 Dean, Jr. et al.
(Continued)

FOREIGN PATENT DOCUMENTS

EP  1 273 944 A1  1/2003
WO  WO 2012/106510 A2  8/2012
WO  WO 2013/077969 A1  5/2013

OTHER PUBLICATIONS

Extended European Search Report for Application No. 15819276.5 dated Jan. 29, 2018.
(Continued)

*Primary Examiner* — John Bedtelyon
(74) *Attorney, Agent, or Firm* — Merchant & Gould P.C.

(57) ABSTRACT

A multi-fiber cable assembly includes an optical connector and a cable. The optical connector includes a connector body; an optical ferrule body, and alignment elements. The optical ferrule body has an end face defining a plurality of alignment openings arranged in rows and has a plurality of buckling chambers. Each buckling chamber is aligned with one of the rows of the alignment openings. The optical fibers of the cable have bare portions secured at a first end of the optical ferrule body using rigid epoxy. Each of the optical fibers is routed through one of the buckling chambers to one of the alignment holes.

20 Claims, 13 Drawing Sheets

Related U.S. Application Data continuation of application No. 14/793,324, filed on Jul. 7, 2015, now Pat. No. 9,599,780.

(60) Provisional application No. 62/091,914, filed on Dec. 15, 2014, provisional application No. 62/021,455, filed on Jul. 7, 2014.

(58) Field of Classification Search
CPC .. G02B 6/3834; G02B 6/3837; G02B 6/3843; G02B 6/3838; G02B 6/3839; G02B 6/3855; G02B 6/3861; G02B 6/3863; G02B 6/3885; G02B 6/40; G02B 6/403; G02B 6/3879
See application file for complete search history.

(56) References Cited

U.S. PATENT DOCUMENTS

| | | | |
|---|---|---|---|
| 5,778,122 A | 7/1998 | Giebel et al. | |
| 5,796,896 A | 8/1998 | Lee | |
| 6,062,740 A | 5/2000 | Ohtsuka et al. | |
| 6,259,856 B1 | 7/2001 | Shahid | |
| 6,364,539 B1 | 4/2002 | Shahid | |
| 6,409,394 B1 | 6/2002 | Ueda et al. | |
| 6,565,265 B2 | 5/2003 | Ohtsuka et al. | |
| 7,077,577 B2 | 7/2006 | Trezza et al. | |
| 7,744,286 B2 | 6/2010 | Lu et al. | |
| 7,744,288 B2 | 6/2010 | Lu et al. | |
| 7,762,726 B2 | 7/2010 | Lu et al. | |
| 7,942,510 B2 | 5/2011 | Shinada et al. | |
| 7,959,361 B2 | 6/2011 | Lu et al. | |
| 8,740,474 B2 | 6/2014 | Lu | |
| 8,920,043 B2 | 12/2014 | Iwaya et al. | |
| 9,519,114 B2 | 12/2016 | Zimmel et al. | |
| 9,599,780 B2 | 3/2017 | Lu et al. | |
| 10,114,181 B2 | 10/2018 | Lu et al. | |
| 10,146,015 B2 | 12/2018 | Zimmel et al. | |
| 2003/0002806 A1 | 1/2003 | Kang et al. | |
| 2004/0057671 A1 | 3/2004 | Kang et al. | |
| 2008/0089651 A1 | 4/2008 | Lewallen et al. | |
| 2012/0093462 A1 | 4/2012 | Childers et al. | |
| 2012/0237168 A1 | 9/2012 | Aoki et al. | |
| 2013/0084045 A1 | 4/2013 | Aoki et al. | |
| 2013/0209041 A1 | 8/2013 | Szilagyi et al. | |
| 2013/0216186 A1 | 8/2013 | Ott | |
| 2013/0216189 A1* | 8/2013 | Grinderslev | G02B 6/3879 385/78 |
| 2014/0072265 A1* | 3/2014 | Ott | G02B 6/4429 385/87 |
| 2016/0161680 A1* | 6/2016 | Nguyen | G02B 6/3879 385/59 |

OTHER PUBLICATIONS

International Search Report and Written Opinion for Application No. PCT/US2015/039350 dated Sep. 25, 2015.

* cited by examiner

OPTICAL FERRULE FOR MULTI-FIBER CABLE AND HARDENED MULTI-FIBER OPTIC CONNECTOR THEREFORE

CROSS REFERENCE TO RELATED APPLICATIONS

This application is a continuation of application Ser. No. 15/463,639, filed Mar. 20, 2017, now U.S. Pat. No. 10,114,181, which is a continuation of application Ser. No. 14/793,324, filed Jul. 7, 2015, now U.S. Pat. No. 9,599,780, which application claims the benefit of provisional application Ser. No. 62/021,455, filed Jul. 7, 2014, and titled "Optical Ferrule for Multi-Fiber Cable," and provisional application Ser. No. 62/091,914, filed Dec. 15, 2014, and titled "Optical Ferrule for Multi-Fiber Cable and Hardened Multi-Fiber Optic Connector Therefore" which applications are incorporated herein by reference in their entirety.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems.

Fiber optic connectors can be used to optically interconnect two lengths of optical fiber. A typical fiber optic connector includes a ferrule assembly supported at a distal end of a connector housing. A spring is used to bias the ferrule assembly in a distal direction relative to the connector housing. The ferrule functions to support an end portion of at least one optical fiber. The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respected optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter. Some optical connectors terminate only a single optical fiber each. Other optical connectors (e.g., an MPO connector) can terminate up to about twenty-four optical fibers.

Improvements are desired.

SUMMARY

In accordance with some aspects of the disclosure, an optical ferrule includes a ferrule body extending from a first end to a second end. The first end is configured to receive and anchor optical fibers. The second end defines an end face, which defines 144 alignment openings.

In certain examples, a footprint of the end face of the ferrule body is identical with a footprint of a standard MPO connector.

In certain examples, first and second alignment arrangements are disposed at opposite sides of the end face. In an example, each of the alignment arrangements can be either an alignment pin or an alignment hole. In another example, a spacing between the first and second alignment arrangements is identical to a spacing between first and second alignment arrangements of a standard MPO connector. In an example, the plurality of alignment channels includes 144 alignment channels.

In certain examples, a cross-dimension of the alignment channels is no more than 255 μm. In certain examples, the cross-dimension of the alignment channels is no more than 126 μm. In certain examples, the cross-dimension of the alignment channels is no more than 81 μm.

In accordance with other aspects of the disclosure, a multi-fiber connector includes a connector body having an anchor end and a keying end; and a ferrule body carried by the connector body to partially protrude at the keying end of the connector body. The ferrule body extends from a first end to a second end. The first end is configured to receive and anchor optical fibers. The second end defines an end face. The end face defines one hundred forty-four alignment openings extending towards the first end of the ferrule body. The multi-fiber connector also includes first and second alignment elements disposed at opposite sides of the alignment openings defined at the end face of the ferrule body.

In certain implementations, the connector body provides an environmental seal between the connector body and the multi-fiber cable and provides an environmental seal between the connector body and a receptacle at which the multi-fiber connector is received. In certain examples, sealing between the cable and the connector can be accomplished using radial seals and/or axial seals. In an example, a heat recoverable sleeve can be applied over the optical cable and over a portion of the optical fiber connector. In an example, the connector body carries an external gasket for environmental sealing of the multi-fiber connector to a component.

In certain examples, the environmental seal can be activated by a twist-to-lock fastener coupled to the connector body. In an example, the twist-to-lock fastener includes a threaded coupling nut. In another example, the twist-to-lock fastener includes a bayonet connection.

In some examples, the alignment openings are disposed in a 12×12 configuration. In other examples, the alignment openings are disposed in a 8×18 configuration.

In certain examples, the alignment structure includes guide pins. In certain examples, the alignment structure includes guide holes.

In some examples, each alignment opening leads from the end face to a buckling chamber. In other examples, each alignment opening leads from the end face to an expanded alignment channel.

In accordance with other aspects of the disclosure, a multi-fiber cable assembly includes an optical connector and a cable including at least seventy-two optical fibers. The optical connector includes a connector body having an anchor end and a plug end; an optical ferrule body carried by the connector body; and first and second alignment elements disposed at opposite sides of an end face of the optical ferrule body. The optical ferrule body defines the end face facing outwardly from the plug end of the connector body. The end face defines alignment openings arranged in rows. The cable is anchored to the optical connector. The optical fibers are routed through the first end of the optical ferrule body. The optical fibers have bare portions that are secured at the first end of the optical ferrule body using rigid epoxy. Each of the optical fibers is routed to one of the alignment holes. Each of the optical fibers has a fiber tip that protrudes from the respective alignment hole defined by the end face. The fiber tips are bare and relatively coplanar.

In certain examples, the optical ferrule body defines a buckling chamber for each row of alignment openings. The buckling chamber provides sufficient space to accommodate bending of portions of the optical fibers to enable axial movement of the fiber tips within the alignment openings. In an example, the portions of the optical fibers extending through the buckling chambers are coated and have an outer diameter of about 250 µm.

In certain examples, the optical ferrule body defines expanded alignment channels that each connect to one of the alignment openings. The expanded alignment channels are sized to accommodate bare portions of the optical fibers. In certain examples, a soft adhesive disposed in the expanded alignment channels, the soft adhesive surrounding the bare portions of the optical fibers.

In an example, the bare portions of the optical fibers extending through the expanded alignment channels have an outer diameter of about 125 µm. In an example, the bare portions of the optical fibers extending through the expanded alignment channels have an outer diameter of about 80 µm.

In certain examples, the fiber tips protrude from the end face by at least about 5 µm. In certain examples, the fiber tips protrude from the end face by no more than about 10 µm.

In certain examples, the cable includes one hundred forty-four optical fibers. In some examples, the optical ferrule body is a first optical ferrule body that terminates seventy-two of the optical fibers and the multi-fiber cable assembly also includes a second optical ferrule body that terminates the other seventy-two optical fibers. In other examples, the optical ferrule body defines one hundred forty-four alignment openings, each receiving one of the optical fibers of the cable.

In accordance with other aspects of the disclosure, a fiber optic connector and cable assembly includes a fiber optic cable; and a hardened fiber optic connector relative to which strength components of the cable are anchored. The fiber optic connector includes a connector body in which multiple spring-biased multi-fiber ferrules are mounted. The multi-fiber ferrules are laterally spaced from each other along a dimension perpendicular to a width of the ferrules. The hardened fiber optic connector also includes a robust fastener.

In certain implementations, the hardened fiber optic connector includes a connector body defining a side opening; and a cover that mounts over the side opening to enclose the multi-fiber ferrules within the connector body.

In certain examples, the cover includes a spring compression member that axially compresses the ferrule springs within the connector body when the cover is mounted to the connector body.

In certain examples, the front end of the connector body is defined by a front end plate. The front end plate defines a through-opening through which a portions of the multi-fiber ferrules extend.

In certain examples, the hardened fiber optic connector also includes metal reinforcing sleeve that holds the cover to the connector body; and an outermost sleeve that mounts over the metal reinforcing sleeve. The outermost sleeve limits rearward movement of the reinforcing sleeve relative to the outermost sleeve.

In certain examples, the rear end of the connector body is configured to receive and retain at least one strength member of a fiber optic cable. In examples, the rear end of the connector body is configured to receive and retain at least two strength members of the fiber optic cable. In an example, the fiber optic cable is a flat drop cable.

In certain implementations, lengths of optical fibers have end portions secured within the multi-fiber ferrules. The lengths of optical fibers are spliced to the optical fibers of the fiber optic cable at a splice location. The splice location is positioned within the connector body.

In certain implementations, an optical adapter arrangement including an optical adapter body defining a first port and a second port; and a fastener ring configured to cooperate with the optical adapter body to mount the optical adapter body to a surface. The first port is configured to receive the hardened fiber optic connector and the second port is configured to receive another fiber optic connector. The optical adapter body also includes a first retention region configured to robustly receive the hardened fiber optic connector.

In certain examples, the optical adapter body defines an internal key member and the hardened fiber optic connector defines an axial keyway sized to receive the internal key member when the hardened fiber optic connector is received at the first port of the optical adapter body.

In certain examples, the optical adapter body defines a plurality of second ports.

In certain examples, the hardened fiber optic connector is configured to terminate at least about seventy-two optical fibers. In examples, the hardened fiber optic connector is configured to terminate at least about ninety-six optical fibers. In examples, the hardened fiber optic connector is configured to terminate at least about 144 optical fibers.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Reference will now be made in detail to exemplary aspects of the present disclosure that are illustrated in the accompanying drawings. Wherever possible, the same reference numbers will be used throughout the drawings to refer to the same or like parts.

The present disclosure relates generally to an optical connector suitable for terminating an end of an optical cable having multiple optical fibers. In some implementations, the optical connector is suitable for terminating at least 72 optical fibers of an optical cable. In some implementations, the optical connector is suitable for terminating at least 144 optical fibers of an optical cable. In certain implementations, the optical connector includes a single optical ferrule that holds all of the optical fibers terminated by the optical connector.

Figure 1:
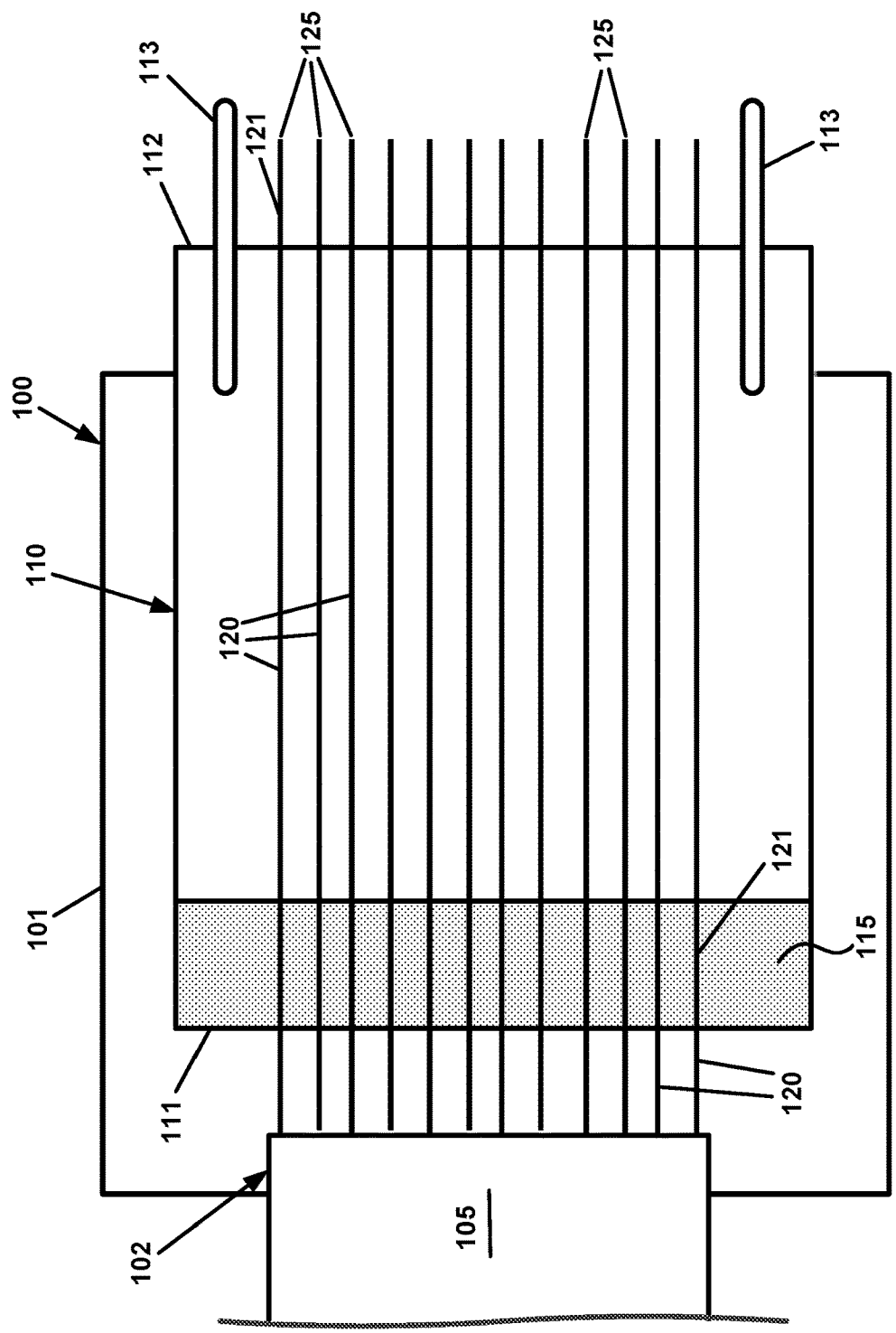
FIG. 1 is a schematic diagram of an example optical connector including a connector body that holds an optical ferrule.

FIG. 1 is a schematic diagram of an example optical connector 100 including a connector body 101 that holds an optical ferrule 110. The connector body 101 includes an anchor section 102 at which an optical cable 105 can be axially fixed to the connector body 101. In certain examples, strength members or a strength layer of the cable 105 is anchored to the connector body 101 at the anchor section 102. In certain examples, the cable jacket is anchored to the connector body 101 at the anchor section 102. In certain examples, both the jacket and the strength members/layer are anchored to the connector body 101.

In some implementations, the optical cable 105 is sealed to the optical fiber connector 100. Sealing between the cable 105 and the connector 100 can be accomplished using radial seals and/or axial seals. For example, a heat recoverable sleeve can be applied over the optical cable 105 and over a portion of the optical fiber connector body 101. In other implementations, a gasket or other sealing member can be disposed between the cable 105 and the connector body 101 to provide an environmental seal. In some implementations, a strain-relief boot can be coupled to the connector body 101 to provide side load strain relief to the cable 105.

In some implementations, the optical fiber connector 100 provides environmental protection when the connector 100 is received at a component (e.g., an optical adapter). For example, in some implementations, the optical fiber connector 100 can include a gasket or other sealing member that provides a seal between the optical fiber connector 100 and the component. Sealing between the component and the connector 100 can be accomplished using radial seals and/or axial seals. In an example, an O-ring can be carried by the connector body 101. In another example, the gasket can be provided on another portion of the connector 100. In other implementations, the optical fiber connector 100 can be configured to press against a gasket or sealing member disposed at the component (e.g., within a receptacle defined by the component).

In some implementations, the environmental seal between the connector body 101 and the component is activated by a twist-to-lock fastener. A twist-to-lock fastener connects a first object to a second object by twisting (e.g., rotating) the fastener to connect the fastener to the second object while the fastener is engaged with the first object. Non-limiting examples of twist-to-lock connections include threaded connections and bayonet connections. In an example, the twist-to-lock fastener includes an external threaded surface to engage an internal threaded surface of the component. In another example, the twist-to-lock fastener includes an internal threaded surface to engage an external threaded surface of the component. In an example, the twist-to-lock fastener includes part of a bayonet connection to mate with a corresponding part of the bayonet connection on the component.

In certain implementations, the twist-to-lock fastener can be disposed over the connector body 101, which can include an outwardly extending flange. To connect the optical connector 100 to the component, the twist-to-lock fastener is moved relative to the connector body 101 to abut the outwardly extending flange. The twist-to-lock fastener is twisted to engage the component (e.g., to engage a threaded surface, to engage a bayonet surface, etc.) to trap the outwardly extending flange between the component and the twist-to-lock fastener. In an example, the gasket or seal can be provided on or in the twist-to-lock fastener.

Multiple optical fibers 120 extend from the cable 105 to the optical ferrule 110. In some implementations, the optical fibers 120 are ribbonized within the cable 105. In certain implementations, the optical fibers 120 are separated from each other as the optical fibers 120 are transitioned between the cable 105 and the optical ferrule 110. In examples, seventy-two (72) optical fibers 120 extend from the cable 105 to the optical ferrule 110. In examples, one hundred forty-four (144) optical fibers 120 extend from the cable 105 to the optical ferrule 110. In the diagram of FIG. 1, twelve optical fibers 120 from a first row of the fiber ribbon are shown extending to the optical ferrule 110.

The optical ferrule 110 extends from a first end 111 to a second end 112. The first end 111 is configured to receive the optical fibers 120 from the cable 105. In some implementations, the optical fibers 120 are secured to the ferrule 110 towards the first end 111 of the ferrule 110. For example, a rigid epoxy 115 can be applied to bare portions 121 of the optical fibers 120 towards the first end 111 of the optical ferrule 110. As the term is used herein, a bare optical fiber includes the core and cladding of the fiber (e.g., bare glass) without any coating. The rigid epoxy 115 bonds to the bare portions 121 of the optical fibers 120 to inhibit axial movement of the optical fibers 120.

The optical fibers 120 extend from the first end 111 to the second end 112, which forms an end face of the optical ferrule 110. In some implementations, the optical fibers 120 have tips 125 that protrude from the optical ferrule 110. For example, the fiber tips 125 may extend about 1 μm to about 10 μm past the end face 112. In examples, the fiber tips 125 may extend about 6 μm to about 10 μm past the end face 112. In an example, the fiber tips 125 may extend about 8 μm past the end face 112. In an example, the fiber tips 125 may extend about 10 μm past the end face 112. In other implementations, the optical fibers 120 have tips 125 that are flush with the end face 112. In certain implementations, the fiber tips 125 are generally co-planar. In some implementations, the fiber tips 125 are laser cleaved. In other implementations, the fiber tips 125 are formed using laser grinding. An example laser grinding process can be found in U.S. Pat. No. 8,740,474, the disclosure of which is incorporated herein by reference.

Figure 2:
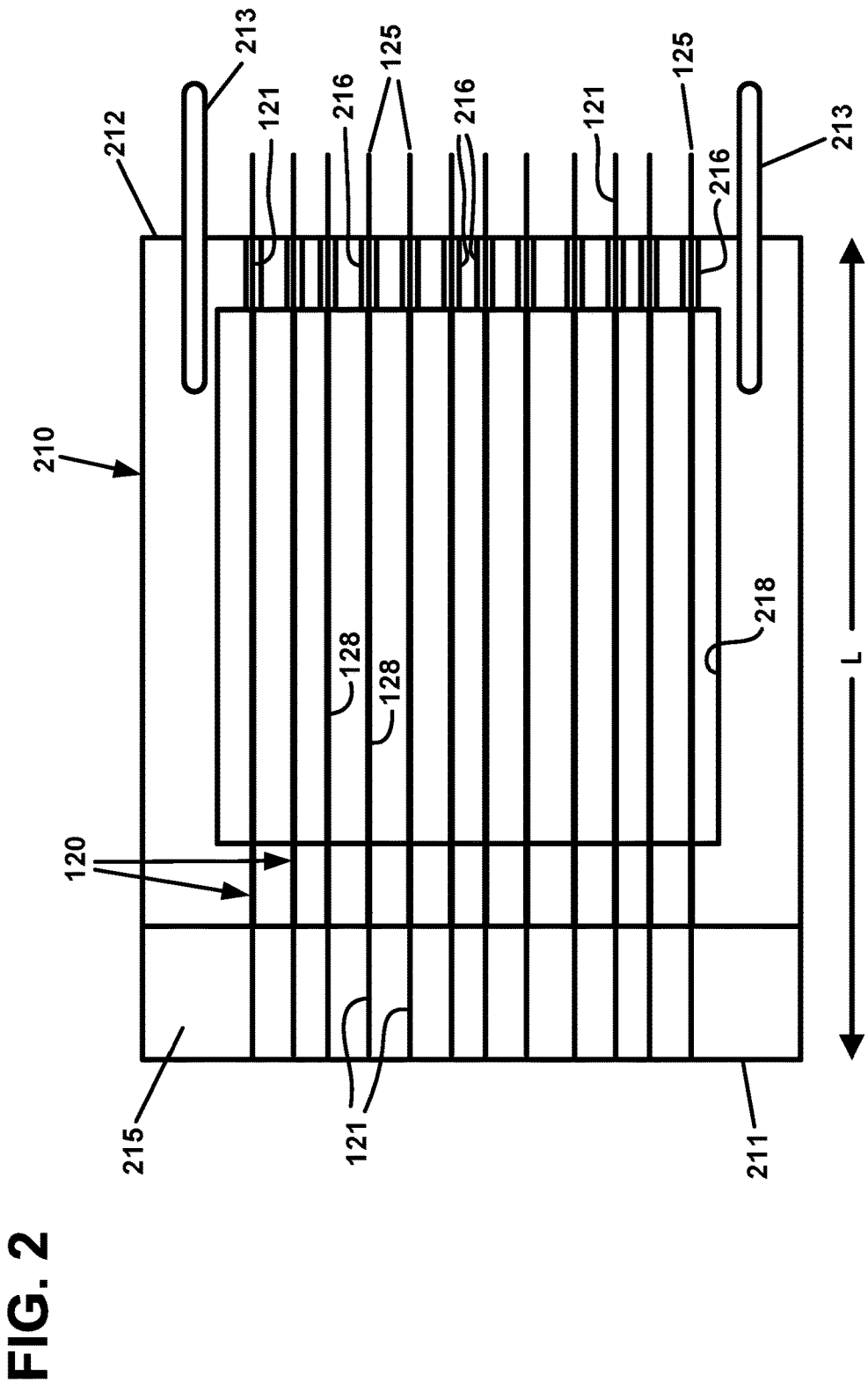
FIG. 2 is a plan view of an example optical ferrule including one or more buckling chambers.
Figure 3:
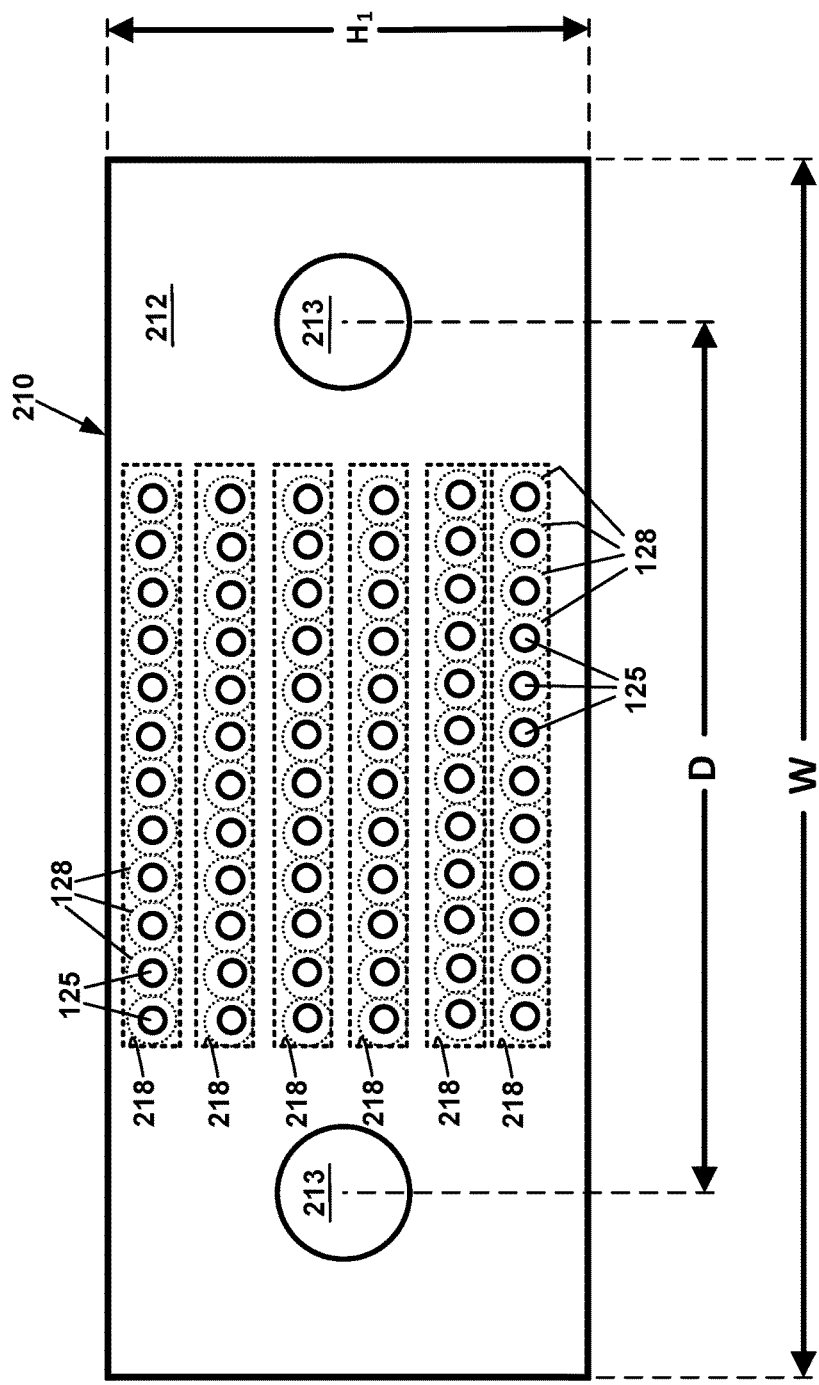
FIG. 3 is a view of the end face of the optical ferrule of FIG. 2.

The optical ferrule 110 includes alignment structures that aid in aligning the optical connector 100 with another optical connector. In some implementations, the alignment structures include guide pins 113. In other implementations, the alignment structures include guide holes sized to receive guide pins 113 of the other optical connector. In still other implementations, each connector 100 can include one guide pin 113 and one guide hole. In certain examples, the optical connector 100 is keyed to indicate a desired rotational orientation and/or the polarity of the optical fibers 120. FIGS. 2-7 illustrate various ferrule designs for the optical ferrule 110 of FIG. 1. For example, FIGS. 2 and 3 illustrate one example optical ferrule 210, which has alignment structures 213 and which is suitable for use in the optical connector 100. The optical ferrule 210 extends along a length L (FIG. 2) from a first end 211 to a second end 212, which forms the end face of the ferrule 210. The optical ferrule 210 also has a width W and a height H (FIG. 3). The alignment structures 213 are spaced along the width W by a distance D. In an example, the length L, width W, height H, and distance D are the standard dimensions for an MPO ferrule. In an example, the dimensions comply with FOCIS 5 or IEC-61754-7 standards, the disclosures of which are incorporated herein by reference. In an example, the length L is about 8 mm, the width W is about 7 mm, the height H is about 2.5 mm, and the alignment spacing D is about 4.6 mm.

Bare portions 121 of optical fibers 120 are secured to the optical ferrule 210 at the first end 211. For example, rigid epoxy 215 can bond to the bare portions 121 of the optical fibers 120 and to the optical ferrule 210. At the second end 212 of the optical ferrule 210, tips 125 of the optical fibers 120 pass through alignment openings 216. In certain examples, one or more of the tips 125 extend past the ferrule end face 212. In other examples, one or more of the tips 125 terminate at the end face 212. In still other examples, one or more of the tips 125 can be recessed within the alignment openings 216.

In some implementations, the tips 125 of the optical fibers 120 include bare portions 121 of the optical fibers 120. The alignment openings 216 are sized to fit closely to the bare portions 121 of the optical fibers 120. In examples, the optical fiber tips 125 have diameters of about 125 µm. In such examples, the alignment opening 216 is less than 126 µm. In an example, the alignment opening 216 is less than 125.5 µm. In other examples, the optical fiber tips 125 have diameters of about 80 µm. In such examples, the alignment opening 216 is less than 81 µm. In an example, the alignment opening 216 is less than 80.5 µm.

In some implementations, the optical ferrule 210 includes one or more buckling chambers 218 disposed between the first and second ends 211, 212 of the optical ferrule 210. For example, the buckling chamber(s) 218 can be disposed between the rigid epoxy 215 and the alignment holes 216. The buckling chamber(s) 218 do not contain epoxy. The buckling chamber(s) 218 provide sufficient space to enable separated, loose fibers 120 to bend or otherwise flex within the buckling chamber(s) 218. For example, the buckling chamber 218 can be sized to enable the optical fibers 120 to bend relative to the ferrule 210 (e.g., along the height H of the optical ferrule 210) to accommodate axial movement of the tip 125 of the optical fibers 120. In some implementations, each buckling chamber 218 is sized to accommodate bending of coated portions 128 of the optical fibers 120. In examples, the coated portions 128 of the optical fibers 120 can have diameters of about 250 µm.

In some implementations, the buckling chambers 218 extend across a majority of the length L of the optical ferrule 210. In other implementations, however, the buckling chamber 218 extends over about half of the length L of the optical ferrule 210. In still other implementations, the buckling chamber 218 extends over less than half of the length L of the ferrule 210. In certain implementations, the alignment holes 216 extend over less than half of the length L of the optical ferrule 210. In certain implementations, the alignment holes 216 extend over less than a quarter of the length L of the optical ferrule 210.

In some implementations, the optical ferrule 210 includes a buckling chamber 218 for each row or ribbon of optical fibers 120 in an optical ribbon arrangement of the cable 105. In certain examples, the buckling chambers 218 are stacked along the height H of the optical ferrule 210 (see FIG. 3). In certain examples, entrances to the buckling chambers 218 may be staggered along the length L of the optical ferrule 210 to facilitate insertion of a specific row or ribbon of fibers 120 into the desired buckling chamber 218. In other implementations, multiple rows or ribbons of optical fibers 120 can be routed to the same buckling chamber 218.

Figure 4:
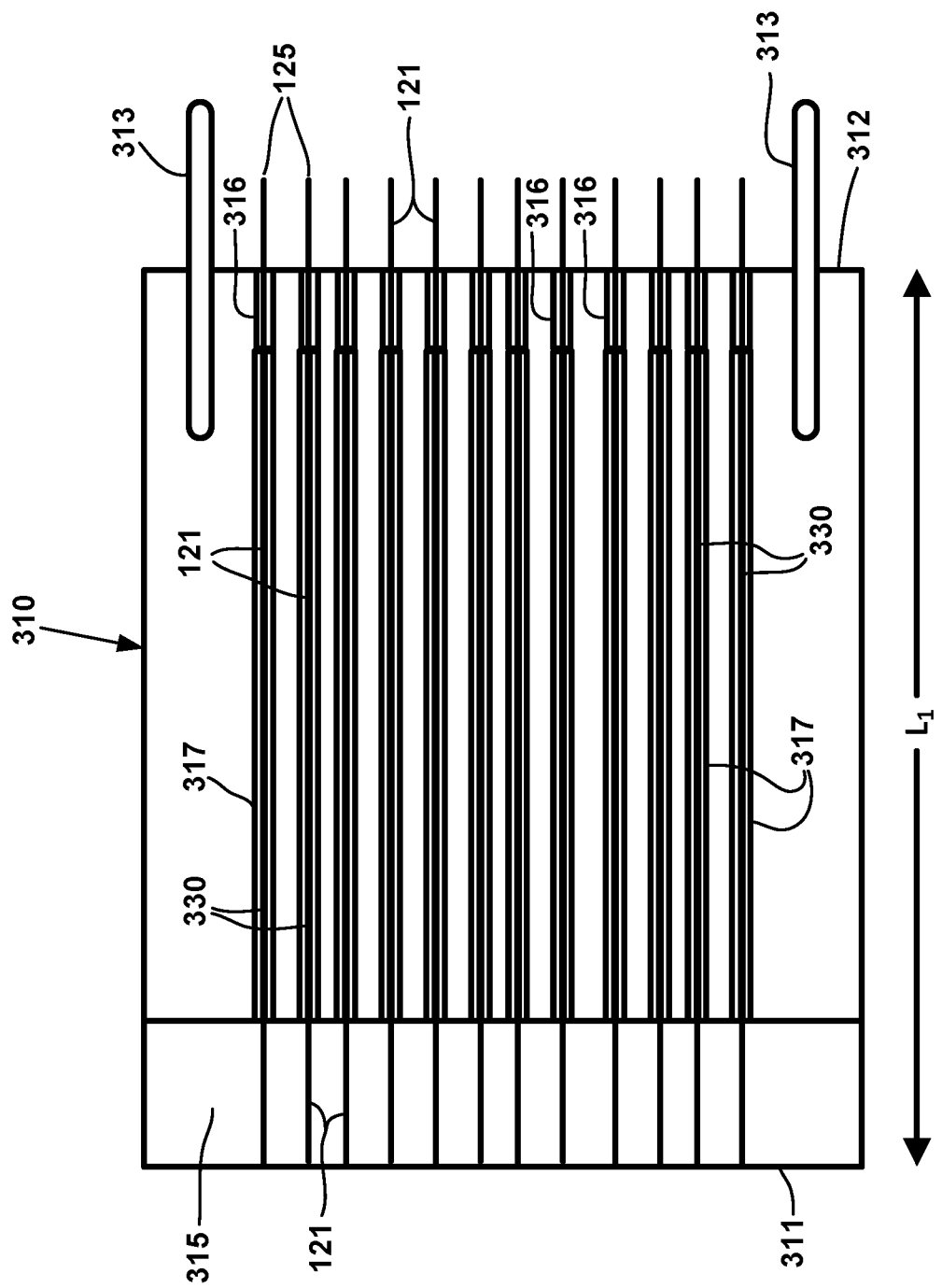
FIG. 4 is a plan view of an example optical ferrule including expanded alignment channels and soft epoxy.
Figure 5:
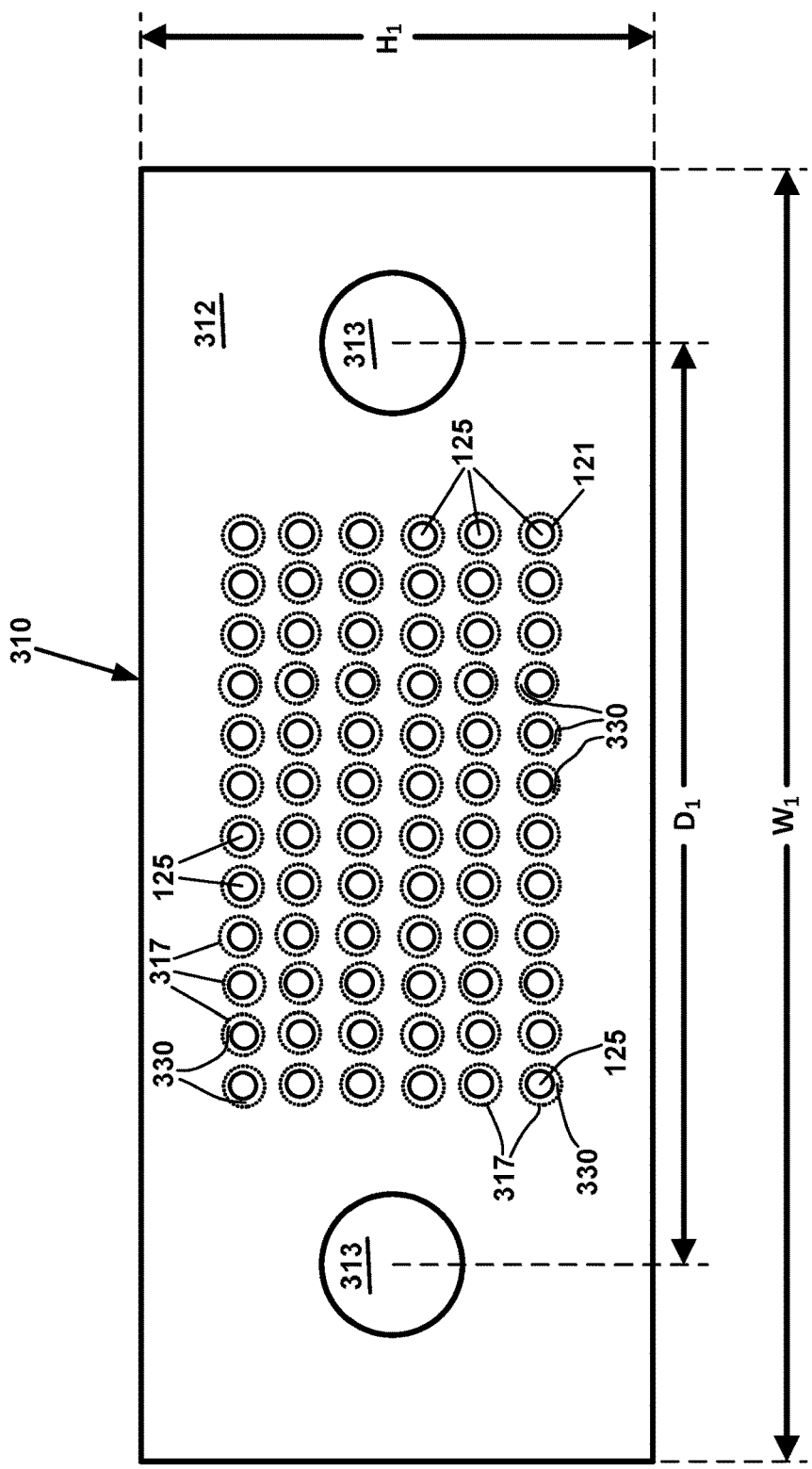
FIG. 5 is a view of the end face of the optical ferrule of FIG. 4.

FIGS. 4 and 5 illustrate another example optical ferrule 310, which has alignment structures 313 and which is suitable for use in the optical connector 100. The optical ferrule 310 extends along a length $L_1$ (FIG. 4) from a first end 311 to a second end 312, which forms the end face of the ferrule 310. The optical ferrule 310 also has a width $W_1$ and a height $H_1$ (FIG. 5). The alignment structures 313 are spaced along the width W1 by a distance D1. In an example, the length L1, width W1, height H1, and distance D1 are the standard dimensions for an MPO ferrule. In an example, the dimensions comply with FOCIS 5 or IEC-61754-7 standards, the disclosures of which are incorporated above. In an example, the length L1 is about 8 mm, the width W1 is about 7 mm, the height H1 is about 2.5 mm, and the alignment spacing D1 is about 4.6 mm.

Bare portions 121 of optical fibers 120 are secured to the optical ferrule 310 at the first end 311. For example, rigid epoxy 315 can bond to the bare portions 121 of the optical fibers 120 and to the optical ferrule 310. At the second end 312 of the optical ferrule 310, tips 125 of the optical fibers 120 pass through alignment openings 316. In certain examples, one or more of the tips 125 extend past the ferrule end face 312. In other examples, one or more of the tips 125 terminate at the end face 312. In still other examples, one or more of the tips 125 can be recessed within the alignment openings 316.

In some implementations, the tips 125 of the optical fibers 120 include bare portions 121 of the optical fibers 120. The alignment openings 216 are sized to fit closely to the bare portions 121 of the optical fibers 120. In examples, the optical fiber tips 125 have diameters of about 125 µm. In such examples, the alignment opening 216 is less than 126 µm. In an example, the alignment opening 216 is less than 125.5 µm. In other examples, the optical fiber tips 125 have diameters of about 80 µm. In such examples, the alignment opening 216 is less than 81 µm. In an example, the alignment opening 216 is less than 80.5 µm.

In some implementations, the optical ferrule 310 includes expanded alignment holes 317 that extend from the alignment openings 316 towards the first end 311 of the ferrule 310. In some implementations, a soft epoxy 330 or other resilient, flowable material is disposed within the expanded alignment holes 317 and surrounds bare portions 121 of the optical fibers 120. The soft epoxy 330 accommodates a slight bending of the optical fibers 120 to adjust the protrusion height during mating of the optical fibers 120 carried by the optical ferrule 310 to fibers of another optical connector. In certain examples, the soft epoxy 330 accommodates axial compression of the optical fibers 120 (e.g., during mating with another optical connector). The epoxy 330 protects the fibers 120, which may aid reliability of optical transmission through the fibers 120.

The cross-dimensions (e.g., diameters) of the expanded alignment holes 317 are larger than cross-dimensions (e.g., diameters) of the alignment openings 316. The cross-dimensions of the expanded alignment holes 317 are sized to fit tightly against the bare portions 121 of the optical fibers 120. In some examples, the bare portions 121 of the optical fibers 120 have diameters of about 125 µm. In some such examples, the expanded alignment holes 317 have cross-dimensions of no more than 130 µm. In certain examples, the expanded alignment holes 317 have cross-dimensions of no more than 128 µm. In an example, the expanded alignment holes 317 have cross-dimensions of no more than 126 µm. In other examples, the bare portions 121 of the optical fibers 120 have diameters of about 80 µm. In such examples, the expanded alignment holes 317 have cross-dimensions of no more than 85 µm. In certain such examples, the expanded alignment holes 317 have cross-dimensions of no more than 83 µm. In an example, the expanded alignment holes 317 have cross-dimensions of no more than 81 µm.

In some implementations, the expanded alignment holes 317 extend across a majority of the length $L_1$ of the optical ferrule 310. In other implementations, however, the expanded alignment holes 317 extend over about half of the length $L_1$ of the optical ferrule 310. In still other implementations, the expanded alignment holes 317 extend over less than half of the length $L_1$ of the ferrule 310. In certain implementations, the alignment holes 316 extend over less than half of the length $L_1$ of the optical ferrule 310. In certain implementations, the alignment holes 316 extend over less than a quarter of the length $L_1$ of the optical ferrule 310.

In certain implementations, the optical ferrules disclosed herein can be configured to hold greater than seventy-two optical fibers 120. In certain examples, any of the optical ferrules disclosed above can be configured to hold over one hundred optical fibers 120. In certain examples, any of the optical ferrules disclosed above can be configured to hold over one hundred twenty optical fibers 120. In certain examples, any of the optical ferrules disclosed above can be configured to hold about one hundred forty-four optical fibers 120.

Figure 6:
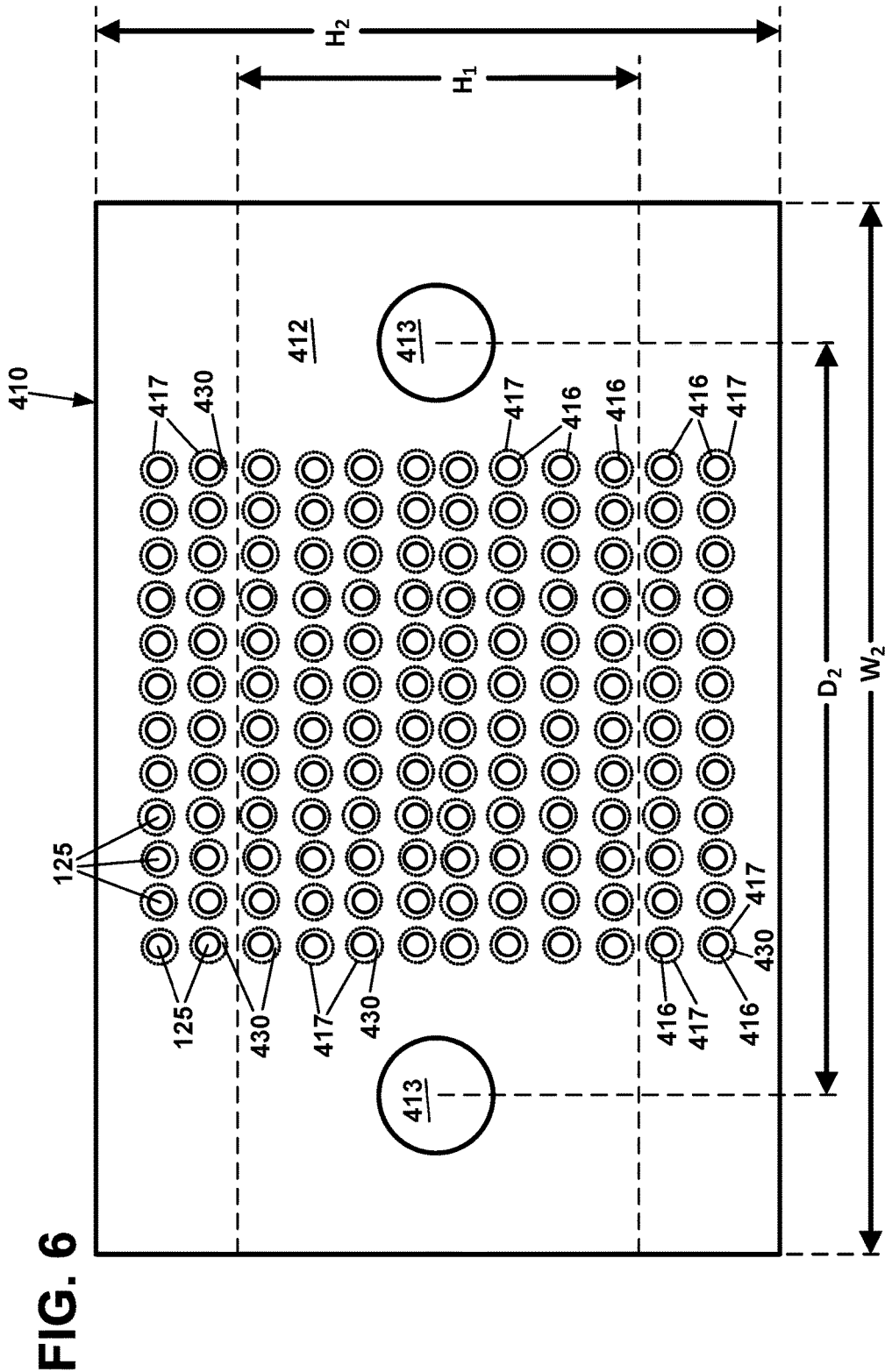
FIG. 6 is a view of an end face of another example optical ferrule defining a 12×12 array of alignment openings.

FIG. 6 illustrates one example optical ferrule 410 that is configured to hold one hundred forty-four (144) optical fibers 120 and which is suitable for use in the optical connector 100. An end face 412 of the optical ferrule 410 defines one hundred forty-four alignment openings 416 through which the fiber tips 125 of the optical fibers 120 extend or are accessible. The ferrule 410 also defines expanded alignment holes 417 in which soft epoxy 430 is disposed to protect the bare portions 121 of the optical fibers 120 extending therethrough. A length, width W2, and alignment spacing D2 of the optical ferrule 410 are the same as the length L1, width W1, and alignment spacing D1 of the optical ferrule 310.

In fact, the ferrule 410 is substantially similar to the optical ferrule 310 shown in FIGS. 4 and 5, except as will be described herein with reference to FIG. 6. A height $H_2$ of the optical ferrule 410 is larger than the height $H_1$ of the optical ferrule 310 (see the comparison in FIG. 6). The larger height $H_2$ of the optical ferrule 410 provides the space needed to accommodate the one hundred forty-four (144) alignment openings 416. In the example shown, the alignment openings 416 are disposed in a 12×12 matrix. In other examples, the alignment openings 416 are disposed in any desired configuration.

Figure 7:
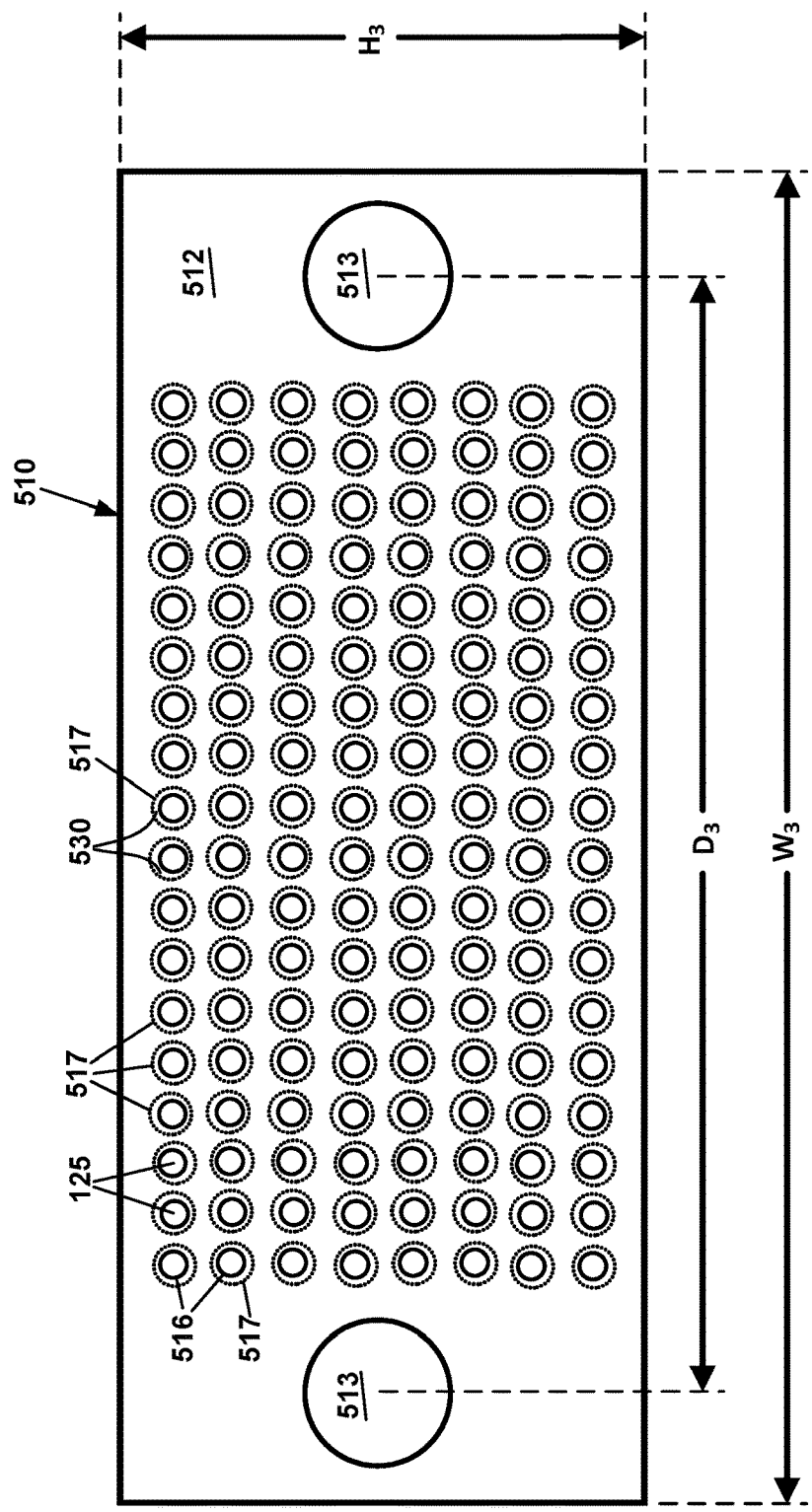
FIG. 7 is a view of an end face of another example optical ferrule defining a 8×18 array of alignment openings.

FIG. 7 illustrates another example optical ferrule 510 that is configured to hold one hundred forty-four (144) optical fibers 120 and which is suitable for use in the optical connector 100. An end face 512 of the optical ferrule 510 defines one hundred forty-four alignment openings 516 through which the fiber tips 125 of the optical fibers 120 extend or are accessible. The ferrule 510 also defines expanded alignment holes 517 in which soft epoxy 530 is disposed to protect the bare portions 121 of the optical fibers 120 extending therethrough. A length, width W3, and height H3 of the optical ferrule 510 are the same as the length L1, width W1, and height H3 of the optical ferrule 310. Accordingly, the end face 512 of the optical ferrule 510 has a common footprint with the end face 312 of the optical ferrule 310.

In fact, the ferrule 510 is substantially similar to the optical ferrule 310 shown in FIGS. 4 and 5, except as will be described herein with reference to FIG. 7. A spacing $D_3$ between the alignment structures 513 of the optical ferrule 510 is greater than the spacing $D_1$ between the alignment structures 313 of the optical ferrule 310. The greater spacing $D_3$ of the alignment structures 513 provides the space needed to accommodate the one hundred forty-four (144) alignment openings 516 without modifying the footprint of the end face 512 from a standard MPO end face footprint. For example, a greater number of alignment openings 516 can be disposed between the alignment structures 513. In the example shown, the alignment openings 516 are disposed in an 8×18 matrix. In other examples, the alignment openings 516 are disposed in any desired configuration.

In other implementations, one or both of the optical ferrules 410, 510 can include buckling chambers similar to the buckling chambers 218 of FIGS. 2 and 3 instead of the expanded alignment holes 417, 517. In such implementations, the optical ferrule 410, 510 is substantially similar to the optical ferrule 210 of FIGS. 2 and 3, except in the dimensions and number of alignment openings 416, 516 as described above with reference to FIGS. 6 and 7.

FIGS. 8-13 illustrate a fiber optic cable assembly 700 including a fiber optic cable 705 terminated by a fiber optic connector arrangement 710. The fiber optic connector arrangement 710 includes a fiber optic connector 701 having at least one multi-fiber ferrule 781 (e.g., optical ferrules 110, 210, 310, 410, or 510). In accordance with certain aspects, the fiber optic connector 701 includes a plurality of multi-fiber ferrules 781 (e.g., optical ferrules 110, 210, 310, 410, or 510).

In certain implementations, each of the multi-fiber ferrules is configured to hold at least about twelve optical fibers. In certain implementations, each of the multi-fiber ferrules is configured to hold at least about twenty-four optical fibers. In certain implementations, each of the multi-fiber ferrules is configured to hold at least about thirty-six optical fibers. In certain implementations, each of the multi-fiber ferrules is configured to hold at least about forty-eight optical fibers. In certain implementations, each of the multi-fiber ferrules is configured to hold at least about seventy-two optical fibers. In certain implementations, each of the multi-fiber ferrules is configured to hold at least about ninety-six optical fibers. In certain implementations, each of the multi-fiber ferrules is configured to hold at least about 120 optical fibers. In certain implementations, each of the multi-fiber ferrules is configured to hold at least about 144 optical fibers.

In accordance with some aspects, the fiber optic connector arrangement 710 may be hardened so that a ruggedized connection can be made between the fiber optic connector arrangement 710 and an enclosure (e.g., a fiber optic adapter) or another connector. As the term is used herein, a connection is "ruggedized" when the optical connector arrangement 710 is configured to be environmentally sealed and robustly connected with the enclosure or other connector. As the term is used herein, a "robust connection" refers to a connection of an optical connector arrangement 110 to the enclosure or other connector such that the optical connector arrangement 110 can withstand an axial load of at least 100 pounds without pulling away from the enclosure or other connector. In certain examples, a robust connection structure includes twist-to-lock connections. In an example, a twist-to-lock connection includes a bayonet connection. In another example, a twist-to-lock connection includes a threaded connection. Some non-limiting example ruggedized optical connector interfaces suitable for use with an indexing terminal are disclosed in U.S. Pat. Nos. 7,744,288, 7,762,726, 7,744,286, 7,942,510, and 7,959,361, the disclosures of which are hereby incorporated herein by reference.

Figure 8:
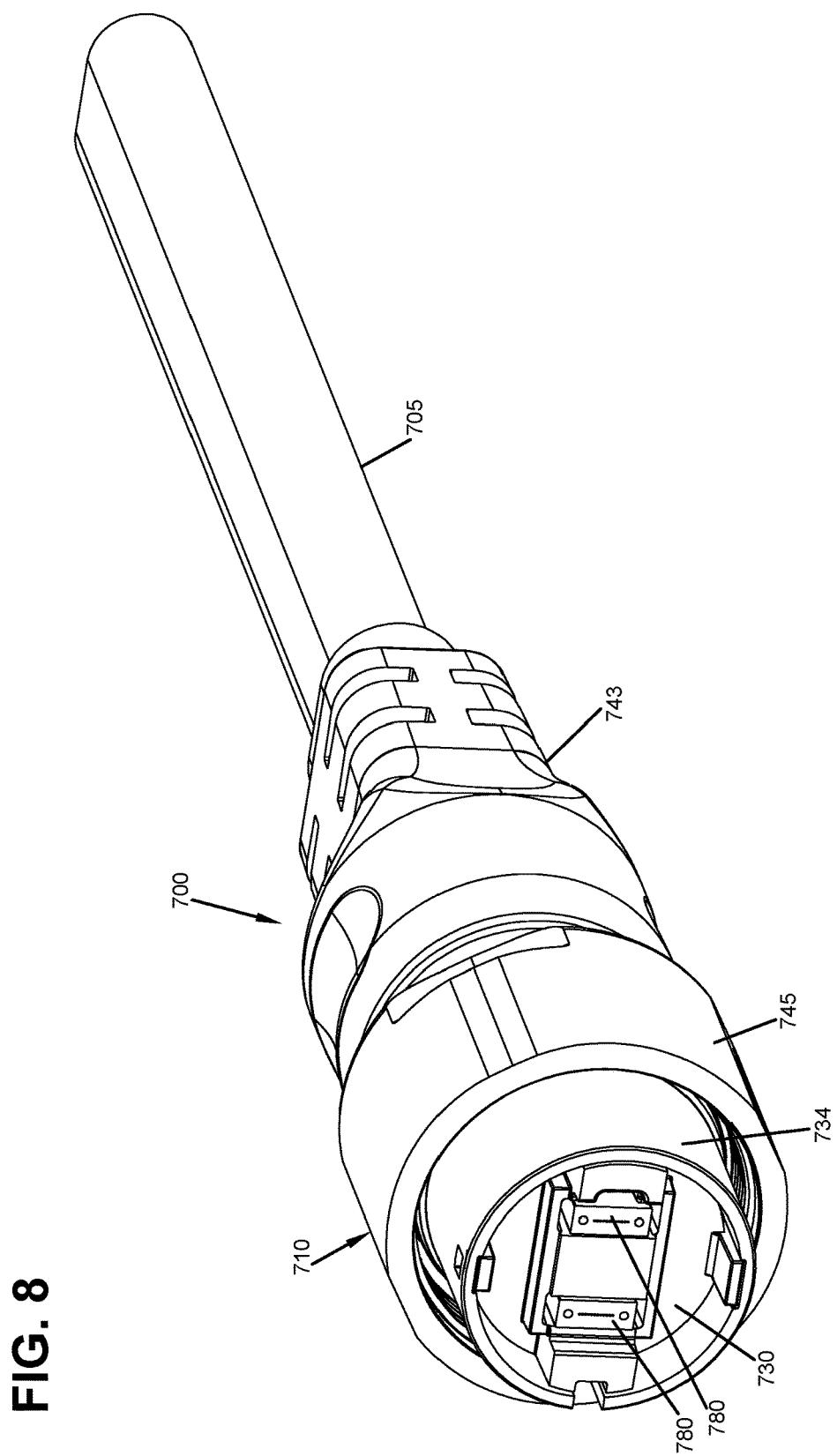
FIG. 8 is a front perspective view of an example fiber optic cable assembly including a fiber optic cable terminated by a fiber optic connector arrangement.
Figure 9:
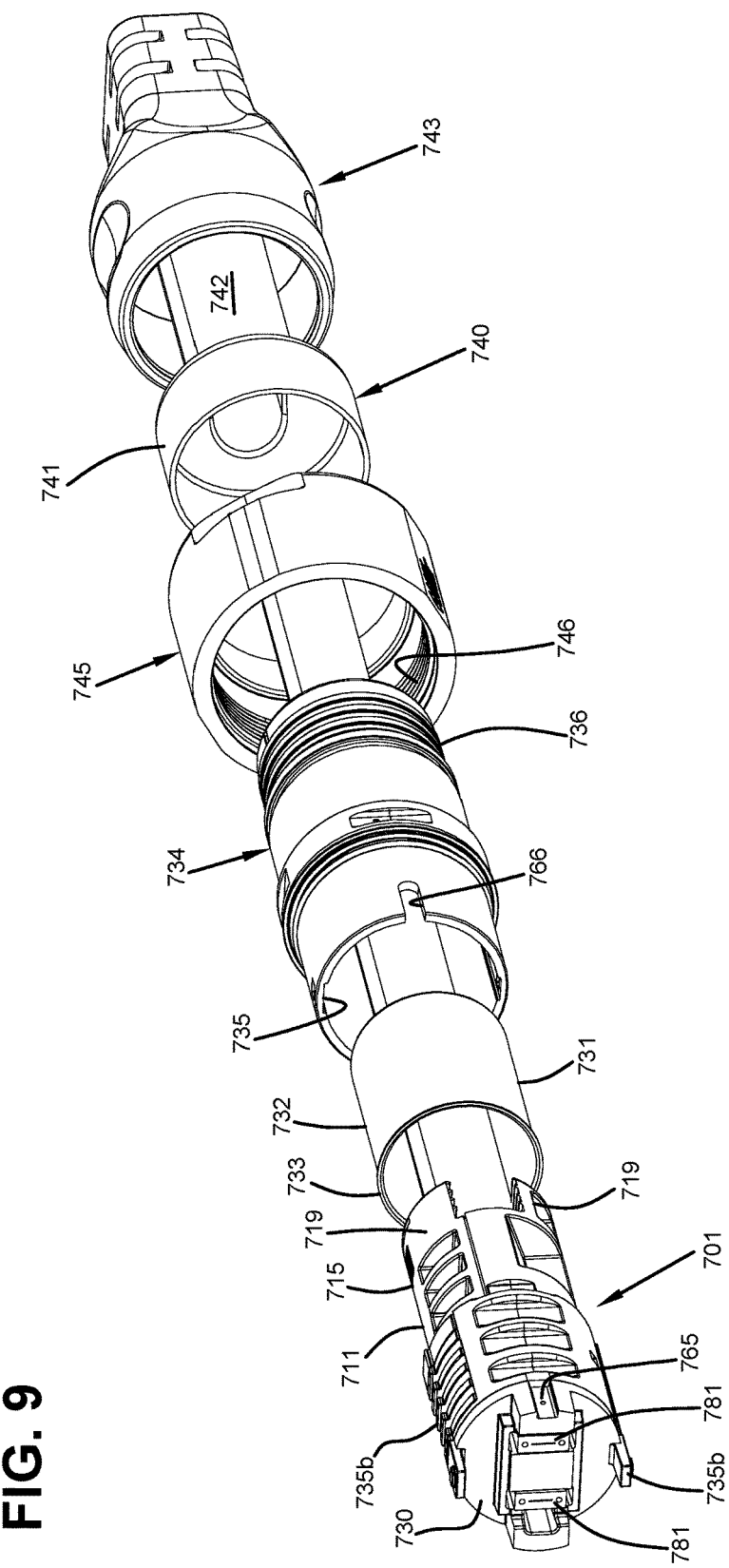
FIG. 9 is an exploded view of the fiber optic cable assembly of FIG. 8.

FIG. 9 shows an exploded view of the example fiber optic cable assembly 700 of FIG. 8. The example fiber optic connector arrangement 710 includes a fiber optic connector 101 having a body 711 and a plurality of spring-biased ferrule arrangements 780. In the example shown, the fiber optic connector 701 includes two spring-biased ferrule arrangements 780. A metal reinforcing sleeve 731 mounts over a rear portion 715 of the connector body 111. The metal reinforcing sleeve 731 includes a main sleeve body 732 and a lip 733 that projects radially outwardly from the main sleeve body 732. The lip 733 has a rearwardly facing surface.

An outermost sleeve 734 mounts over the metal reinforcing sleeve 731. The outermost sleeve 734 includes an internal shoulder having a forwardly facing surface that abuts the rearwardly facing surface of the lip 733 to limit rearward movement of the reinforcing sleeve 731 relative to the outermost sleeve 734. In certain implementations, the outermost sleeve 734 defines keying features 735 that mate with corresponding keying features 735b of the connector body 711 to ensure proper rotational alignment before the parts when the parts are assembled together. The connector body 111 and the outermost sleeve 734 have a molded plastic construction. An external seal (e.g., an O-ring) mounts about the outermost sleeve 734. The seal provides protection against water, dust, or other contaminants when the hardened connector arrangement 710 is mated with another component.

A front end piece 730 mounts at the front end 712 of the connector body 711 and connects to the outermost sleeve 734 such that the outermost sleeve 734 and the front end piece 730 are secured in place relative to the connector body 711 (i.e., the connector body 711 is captured between the pieces). In certain implementations, the front end piece 730 snap-fits to the outermost sleeve 734. In other implementations, the front end piece 730 otherwise couples to the outermost sleeve 734. Keying features 735c of the front end piece 730 may align with keying features 735a of the outermost sleeve 734 to ensure rotational alignment therein between. The front end piece 130 defines a plurality of through-openings 737 through which a ferrule arrangements 180 of the connector arrangement 710 passes.

A shrink tube 740 (e.g., a shrink fit tube having a heat recoverable layer surrounding an adhesive layer as disclosed in U.S. Pat. No. 5,470,622, the disclosure of which is hereby incorporated by reference herein) and a strain-relief boot 743 protect the optical fibers 106 of the cable 705 as the cable exits the connector arrangement 710. The shrink tube 740 has a forward section 741 that is configured to adherently attach over a rearward section 736 of the outmost sleeve 734 and a rearward section 742 that is configured to adherently attach over the cable 705 when installed. The tube 740 mechanically couples the cable jacket to the sleeve 734 and seals the interface between the cable 705 and the sleeve 734. The strain-relief boot 743 mounts coaxially over the shrink tube 740. The boot 743 and tube 740 are shaped and configured to receive the transverse cross-sectional profile of the cable 705.

A fastener 745 mounts over the outermost sleeve 734 for securing the fiber optic connector arrangement 710 to a component. In certain implementations, the fastener 745 includes a threaded nut. In some implementations, the fastener 745 secures the connector arrangement 710 to another fiber optic connector (e.g., a hardened fiber optic connector). In other implementations, the fastener 745 secures the connector arrangement 710 to a fiber optic adapter arrangement 750 (see FIG. 12). For example, inner threaded region 746 of the fastener 745 may screw into external threads of adapter arrangement 750.

Figure 10:
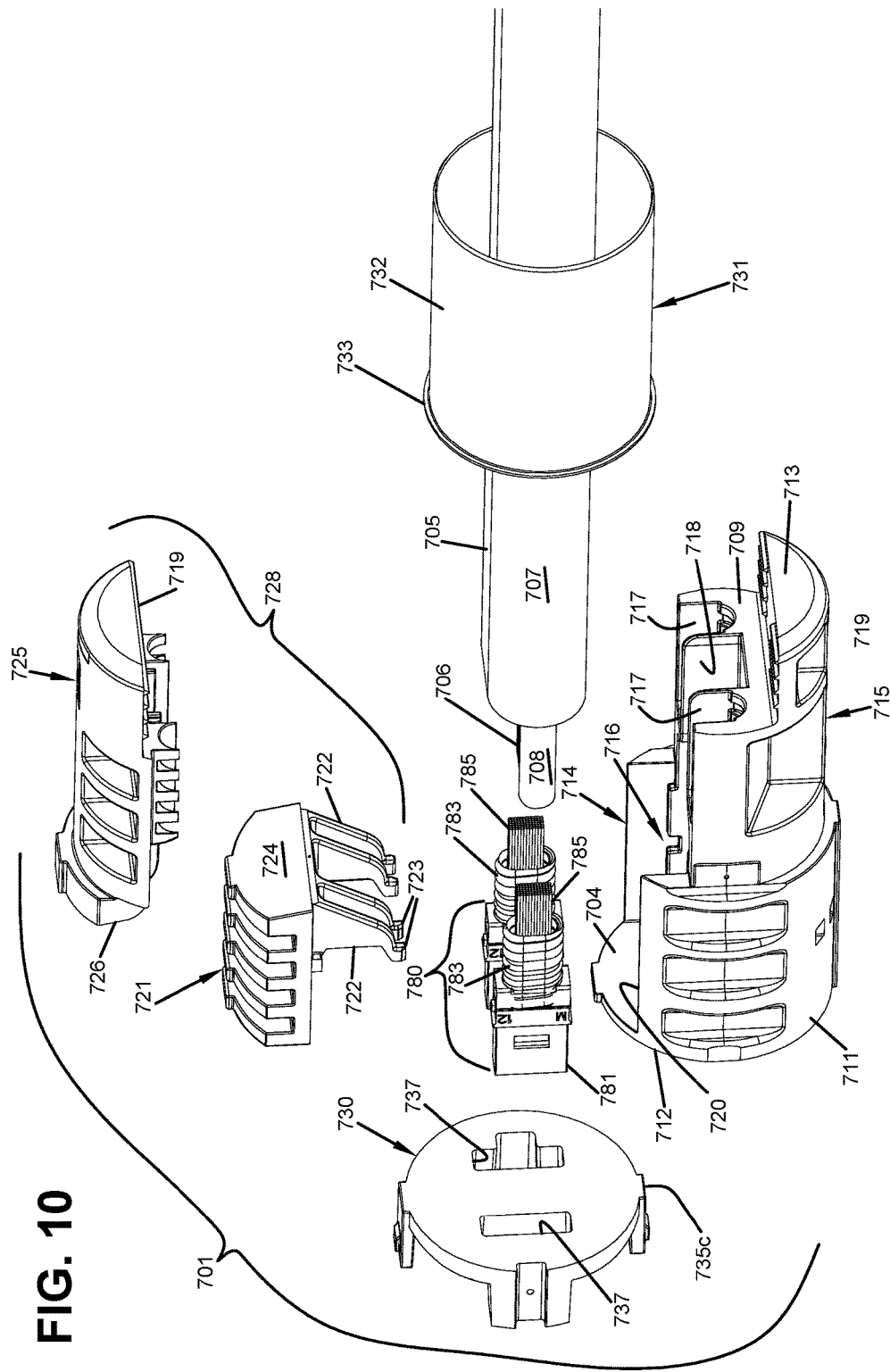
FIG. 10 is an exploded view of an example fiber optic connector of the fiber optic cable assembly of FIG. 8.

FIG. 10 shows one example implementation of a fiber optic connector 701 suitable for terminating a multi-fiber cable, such as cable 705. The fiber optic connector 701 includes a connector body 711, a plurality of multi-fiber ferrule arrangements 780 that mounts at a front end 712 of the connector body 711, and a cover 728. The connector body 711 has a length that extends along an axis of the connector body 711. The connector body 711 includes front and rear ends 712, 713 separated by the length of the connector body 711. The connector body 711 has a forward section 714 and a rearward section 715.

The forward portion 714 defines an interior 716 in which a rear portion of the multi-fiber ferrule arrangements 780 is disposed. Each multi-fiber ferrule arrangement 780 includes a ferrule 781, a ferrule spring 783, and lengths of optical fibers 785 extending rearwardly from the ferrule 781 through the spring 783. The lengths of optical fibers 785 can be spliced to the tips of the optical fibers 706 of the cable 705. For example, a first portion of the optical fibers 706 can be spliced to the lengths of optical fibers 785 of a first multi-fiber ferrule arrangement 780 and a second portion of the optical fibers 706 can be spliced to the lengths of optical fibers 785 of a second multi-fiber ferrule arrangement 780. In the example shown, the first and second portions together include all of the optical fibers 706. Each multi-fiber ferrule arrangement 780 is disposed within the forward section 714 of the body 711 so that the spring 783 biases the respective ferrule 781 in a forward direction through the first end 712 of the connector body 711.

In some implementations, the rear section 715 of the connector body 711 is configured to receive and retain at least one strength component 708 of a fiber optic cable 705. In certain implementations, the rear end 715 of the connector body 711 is configured to receive and retain at least two strength components 108 of the fiber optic cable 705. Strength components 708 of the fiber optic cable 705 are anchored relative to the fiber optic connector 711. For example, in certain implementations, the rear section 715 of the connector body 711 defines one or more chambers 717 in which the strength components 708 may be disposed. In certain implementations, adhesive may be applied to retain the strength components 708 in the chambers 717. In certain implementations, the chambers 717 may include inwardly directed teeth or other retention structures to aid in anchoring the strength components 708 within the chambers 717.

In certain implementations, the fiber passage 718 passes in between the strength component chambers 717. In certain implementations, the inner walls of the connector body 711 taper inwardly from the forward interior 716 to the fiber passage 718 to accommodate the strength component chambers 717. In certain implementations, two fingers 719 extend rearwardly from a rear plate 709 of the connector body 711. Each finger 719 includes inwardly directed teeth adapted to grip/bite into a cable jacket 707 of the cable 705 when the cable 705 is attached to the connector 701.

The connector body 711 also defines a side opening 720 that extends along at least part of the length of the connector body 711. The side opening 720 is arranged and configured to allow the multi-fiber ferrule arrangements 780 to be inserted laterally into the connector body 711 through the side opening 720. In certain implementations, the side opening 720 is arranged and configured to allow the multi-fiber ferrule arrangements 780 and the optical fibers 706 to be inserted laterally into the connector body 711 through the side opening 720. In this way, the optical fibers need not be axially threaded through an opening during the loading process.

The cover 728 mounts over the side opening 720 after the multi-fiber ferrule arrangements 780 has been inserted into the connector body 711 through the side opening 720. In some implementations, the side opening 720 extends along the length of the connector body 711 for at least fifty percent of the length of the connector body 711. Indeed, in some implementations, the side opening 720 extends along the length of the connector body 711 for at least 75 percent of the length of the connector body 711. In the example shown, the lateral access is provided along the length of the connector body 711 from directly behind a front end plate 704 at the front end 712 to the rear end 713 of the connector body 711.

In some implementations, the cover 728 includes a first cover section 721 and a second cover section 725. The first cover section 721 defines a retention surface 724 that is sized and shaped to be covered by a retaining surface 726 of the second cover section 725. In the example shown, the first cover section 721 is disposed over a front portion of the side opening 720 and the second cover section 725 is disposed over a rear portion of the side opening 720. In other implementations, the cover 728 is an integral piece. In some implementations, the cover 728 cooperates with the connector body 711 to define one or more of the strength component chambers 717. In the example shown, the cover 728 cooperates with the connector body 711 to define two strength component chambers 717. In certain implementations, the second portion 725 of the cover 728 cooperates with the connector body 711 to form the strength component chambers 717.

The cover 728 includes one or more spring compression members 722 that axially compresses the springs 783 of the multi-fiber ferrule arrangements 780 within the connector body 711 when the cover 728 is mounted to the connector body 711. In certain examples, the cover 728 includes a spring compression member 722 for each ferrule arrangement 780. In some implementations, each spring compression member 722 extends inwardly from the first cover section 721. In certain implementations, each spring compression member 722 includes an arm that is sized and configured to extend laterally across the connector interior 716 when the cover 728 is coupled to the connector body 711. In the example shown, each spring compression member 722 includes two arms extending laterally from the first cover section 721. In certain implementations, the arms are sized to extend laterally across the connector interior 716 from the cover 728 to a radially opposite side of the connector body 711. In the example shown, the arm includes a distal tip 723 that fits into a slot or recess defined in the radially opposite side of the connector body 711.

Figure 13:
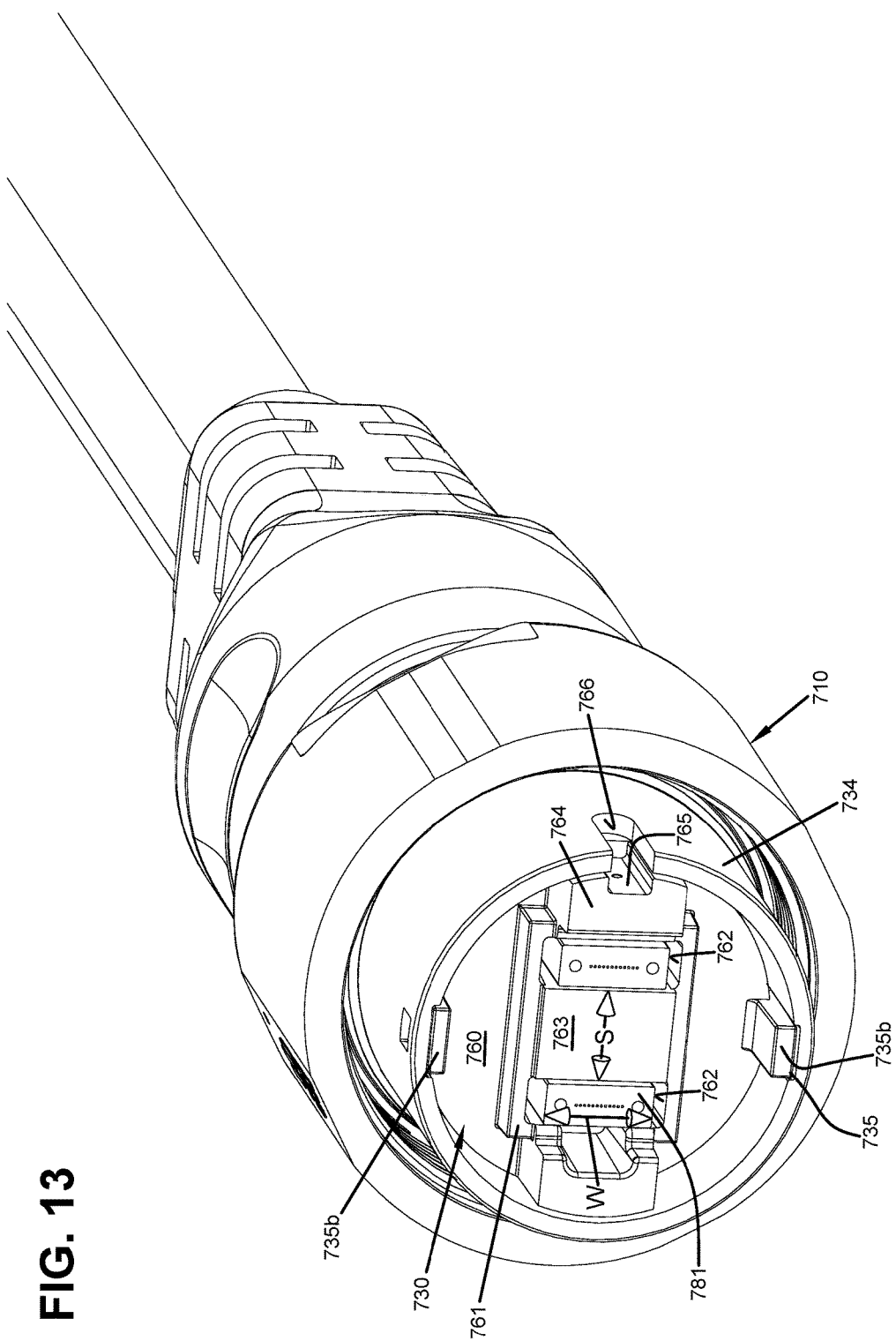
FIG. 13 is an enlarged view of the front face of the fiber optic connector arrangement of FIG. 8.

FIG. 13 illustrates an enlarged view of the front of the fiber optic connector arrangement 710 of FIG. 8. A forward side 760 of the front end piece 730 is visible within the outermost sleeve 734, which extends forward of the fastener 745. End faces of the optical ferrules 781 are visible through apertures 762 defined in the front end piece 730. In certain examples, the optical ferrules 781 are oriented in a common rotational position so that widths W of the ferrules 781 extend parallel to each other. In certain implementations, the apertures 762 (and hence the optical ferrules 181) are laterally spaced apart along a gap S. In the example shown, the gap S extends generally perpendicular to the width W of the ferrules 781. In certain examples, the apertures 762 are defined in a platform 761 of the forward side 760. In certain examples, a raised section 763 extends forwardly of the platform 761 between the ferrules 781.

Figure 11:
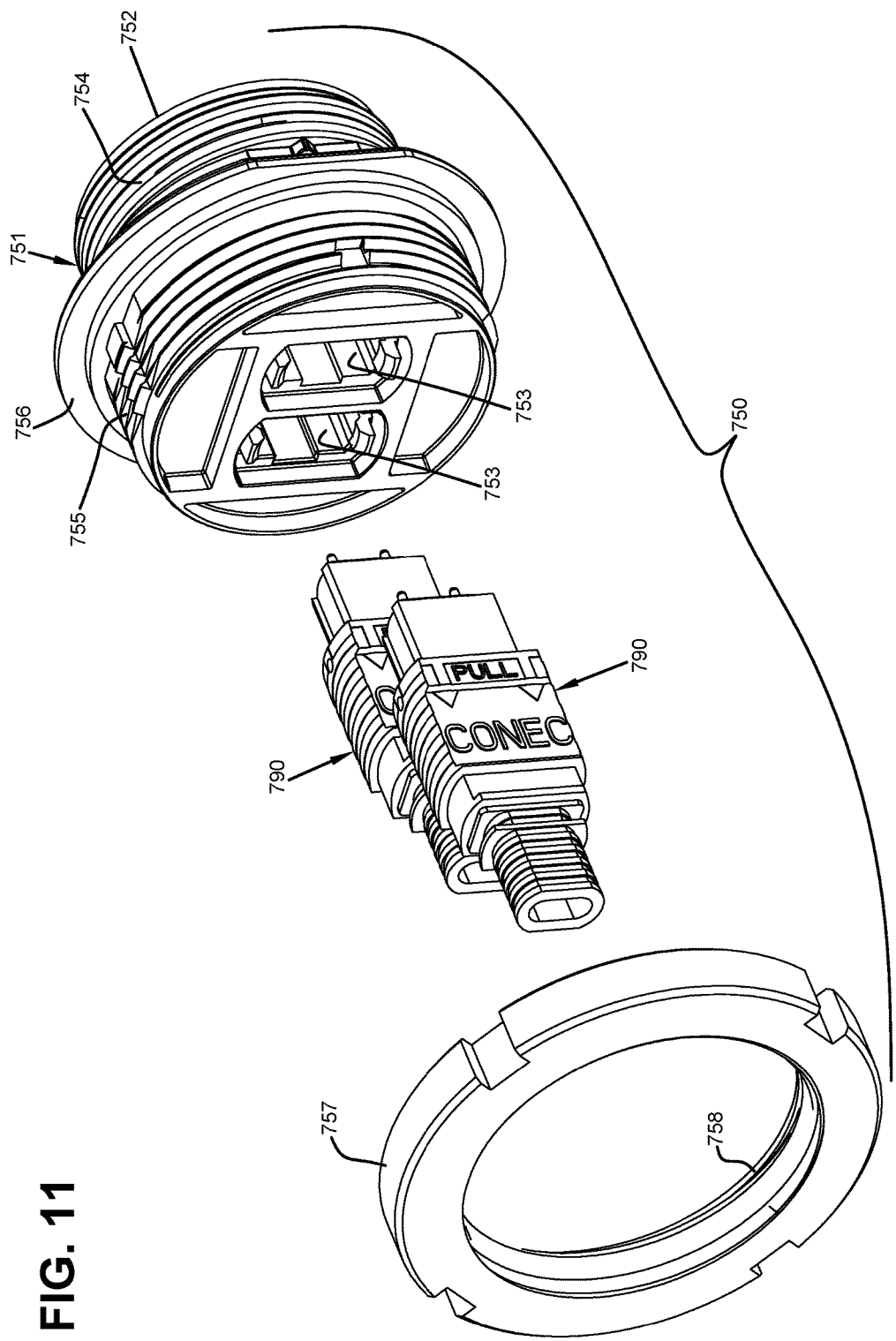
FIG. 11 is a front perspective view of an example fiber optic adapter arrangement including a fastener and optical connectors exploded from an example fiber optic adapter.

FIG. 11 illustrates an example hardened fiber optic adapter arrangement 750 suitable for receiving the fiber optic connector arrangement 710 to make a ruggedized connection therebetween. The fiber optic adapter arrangement 750 includes an optical adapter main body 751 defining a first port 752 (FIG. 12) at which to receive the fiber optic connector arrangement 710 and defining at least one second port 753 (FIG. 11) at which to receive another fiber optic connector 790 to interface with the fiber optic connector 701 of the fiber optic connector arrangement 710. In the example shown, the adapter main body 151 defines two second ports 752. In certain examples, the fiber optic connectors 790 are not hardened (i.e., do not form a ruggedized connection with the fiber optic adapter arrangement 750). In some such implementations, the second-port side of the fiber optic adapter arrangement 750 may be configured to form a ruggedized connection with a wall or enclosure that protects the fiber optic connectors 790.

Figure 12:
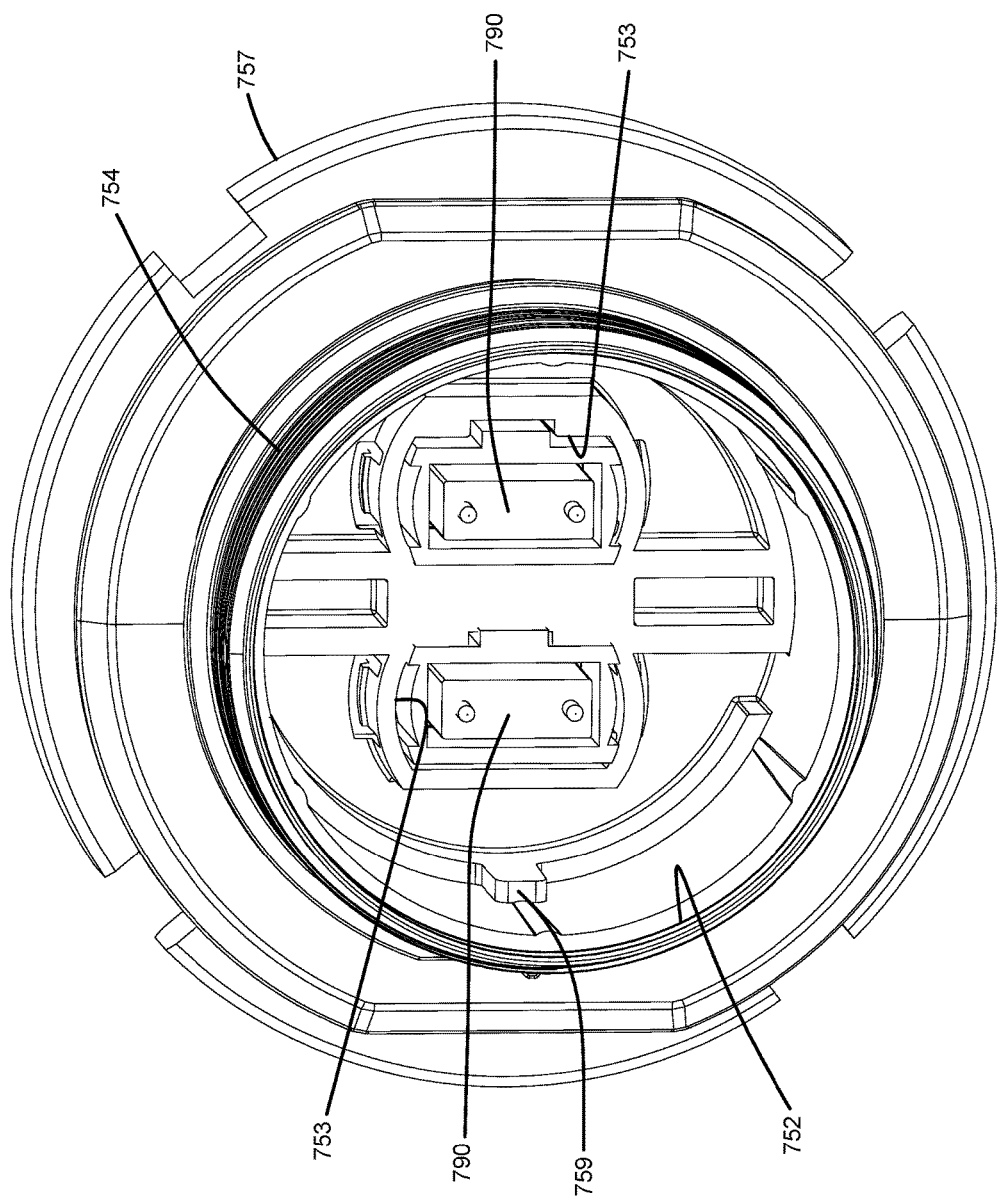
FIG. 12 is a rear perspective view of an assembled version of the fiber optic adapter arrangement of FIG. 11.

In some implementations, the adapter main body 751 includes a first retention section 754 at which the fiber optic connector arrangement 710 can be sealingly and robustly fastened (see FIG. 12). For example, the first retention section 754 may include external threads that can be engaged by the inner threaded region 746 of the fastener 745. A gasket may be disposed between the first retention section 754 and the fastener 745 when the fiber optic connector arrangement 710 is mounted to the first retention section 754.

In some implementations, the adapter main body 751 includes a second retention section 755 configured to engage with a second fastener 757 (see FIG. 11). For example, the second fastener 757 can include a ring-shaped fastener having inner threads 758 configured to engage with external threads of the second retention section 755. In certain implementations, the main body 751 also includes a radial flange 756 that extends outwardly from a location intermediate the first and second retention sections 754, 755. The second fastener 757 cooperates with the radial flange 756 to secure the adapter arrangement 750 to a wall or other surface.

Referring to FIGS. 5 and 13, in some implementations, the connector arrangement 710 is rotationally keyed to the optical adapter 750. The keying facilitates aligning the optical ferrules 781 of the connector arrangement 710 with the optical ferrules of the fiber optic connectors 790. As shown in FIG. 12, an interior of the optical adapter 751 includes a key member 759 extending rearwardly from the front end piece 730. As shown in FIG. 13, the connector arrangement 710 defines a keyway formed by a slot 765 in the front end piece 730 and by a slot 766 defined in the outermost sleeve 734.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A hardened fiber optic connector arrangement comprising:
   a housing arrangement extending between a front and a rear, the front of the housing arrangement including a forward-facing surface, the forward-facing surface defining a plurality of apertures, the rear of the housing arrangement defining a strength member anchoring section;
   a plurality of spring-biased multi-fiber ferrules carried by the housing arrangement, each of the multi-fiber ferrules being disposed at one of the apertures so that a portion of the multi-fiber ferrule extends forwardly of the forward-facing surface, each of the multi-fiber ferrules defines at least seventy-two alignment openings for holding optical fibers;
   an environmental seal carried by the housing arrangement at an exterior of the housing arrangement; and
   a twist-to-lock fastener that activates the environmental seal carried by the housing arrangement.

2. The hardened fiber optic connector arrangement of claim 1, wherein the twist-to-lock fastener includes a threaded coupling nut.

3. The hardened fiber optic connector arrangement of claim 1, wherein the twist-to-lock fastener includes a bayonet connection.

4. The hardened fiber optic connector arrangement of claim 1, wherein each of the multi-fiber ferrules defines at least ninety-six alignment openings.

5. The hardened fiber optic connector arrangement of claim 4, wherein each of the multi-fiber ferrules defines at least 144 alignment openings.

6. The hardened fiber optic connector arrangement of claim 5, wherein the alignment openings of each multi-fiber ferrule are disposed in a 12×12 configuration.

7. The hardened fiber optic connector arrangement of claim 5, wherein the alignment openings are disposed in a 8×18 configuration.

8. The hardened fiber optic connector arrangement of claim 1, wherein the housing arrangement includes a connector housing and an external sleeve mounted around the connector housing, the connector housing carrying the multi-fiber ferrules, and the external sleeve carrying the environmental seal.

9. The hardened fiber optic connector arrangement of claim 8, wherein the connector housing includes a plurality of pieces.

10. The hardened fiber optic connector arrangement of claim 9, wherein the plurality of pieces includes a body and a cover section that cooperate to retain the multi-fiber ferrules at the connector housing.

11. The hardened fiber optic connector arrangement of claim 10, wherein the plurality of pieces also includes a second cover section that cooperates with the body to define the strength member anchoring section.

12. The hardened fiber optic connector arrangement of claim 11, wherein a reinforcing sleeve mounts over the body and the second cover section beneath the external sleeve.

13. The hardened fiber optic connector arrangement of claim 10, wherein the plurality of pieces also includes a front end piece that keys to the external sleeve.

14. The hardened fiber optic connector arrangement of claim 9, wherein the plurality of pieces includes a body and a front end piece, the body carrying the multi-fiber ferrules, and the front end piece cooperating with the external sleeve to capture the body therebetween.

15. The hardened fiber optic connector arrangement of claim 1, further comprising an optical cable including a plurality of optical fibers having ends terminated at the multi-fiber ferrules.

16. The hardened fiber optic connector arrangement of claim 15, wherein the optical cable includes a strength member retained at the strength member anchoring section of the housing arrangement.

17. The hardened fiber optic connector arrangement of claim 16, wherein the optical cable includes a jacket, and wherein the housing arrangement includes teeth that engage the jacket of the optical cable.

18. The hardened fiber optic connector arrangement of claim 15, wherein the optical cable includes a jacket, and wherein the housing arrangement includes teeth that engage the jacket of the optical cable.

19. The hardened fiber optic connector arrangement of claim 15, wherein the plurality of optical fibers includes 144 optical fibers.

20. The hardened fiber optic connector arrangement of claim 1, wherein the plurality of multi-fiber ferrules includes two multi-fiber ferrules, each of the multi-fiber ferrules being independently movable relative to the other.

* * * * *